United States Patent
Igura et al.

(10) Patent No.: US 6,796,604 B2
(45) Date of Patent: Sep. 28, 2004

(54) FRONT-END PANEL

(75) Inventors: Tsuyoshi Igura, Higashihiroshima (JP); Kazuki Hatakeyama, Higashihiroshima (JP); Masanao Ogura, Aki-gun (JP); Seiichi Tsuji, Aki-gun (JP)

(73) Assignees: GP Daikyo Corporation, Hiroshima (JP); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/615,459

(22) Filed: Jul. 9, 2003

(65) Prior Publication Data

US 2004/0046422 A1 Mar. 11, 2004

(30) Foreign Application Priority Data

Jul. 10, 2002 (JP) ........................................ 2002-201886

(51) Int. Cl.$^7$ .............................................. B60R 27/00
(52) U.S. Cl. ............................ 296/193.03; 296/193.09; 296/203.02
(58) Field of Search ....................... 296/193.03, 203.02, 296/193.09, 193.04, 30, 203.04, 203.03

(56) References Cited

U.S. PATENT DOCUMENTS

| | | | | | |
|---|---|---|---|---|---|
| 5,409,288 A | * | 4/1995 | Masuda | ................. | 296/193.09 |
| 5,658,041 A | * | 8/1997 | Girardot et al. | ........ | 296/193.09 |
| 6,189,958 B1 | * | 2/2001 | Guyomard et al. | .... | 296/203.02 |
| 6,216,810 B1 | * | 4/2001 | Nakai et al. | ........... | 296/193.09 |
| 6,273,496 B1 | * | 8/2001 | Guyomard et al. | .... | 296/193.09 |
| 6,347,823 B1 | * | 2/2002 | Ozawa et al. | .......... | 296/193.09 |
| 6,357,821 B1 | * | 3/2002 | Maj et al. | .............. | 296/193.09 |
| 6,412,855 B1 | * | 7/2002 | Cantineau et al. | ..... | 296/193.09 |
| 6,516,906 B2 | * | 2/2003 | Sasano et al. | ......... | 296/203.02 |
| 6,523,886 B2 | * | 2/2003 | Hoffner et al. | ........ | 296/203.02 |
| 6,547,317 B1 | * | 4/2003 | Cheron et al. | ......... | 296/193.09 |
| 6,592,175 B2 | * | 7/2003 | Shibata | .................. | 296/203.02 |
| 6,634,702 B1 | * | 10/2003 | Pleschke et al. | ....... | 296/203.02 |

FOREIGN PATENT DOCUMENTS

| | | |
|---|---|---|
| DE | 199 46 349 A1 | 3/2001 |
| EP | 0 967 138 A2 | 12/1999 |
| JP | 105115/1993 | 4/1993 |
| JP | 264855/1998 | 10/1998 |
| JP | 2931605/1999 | 5/1999 |
| JP | 152062/1999 | 6/1999 |
| WO | WO 02/068258 A1 | 9/2002 |

* cited by examiner

*Primary Examiner*—Kiran Patel
(74) *Attorney, Agent, or Firm*—Nixon & Vanderhye, P.C.; Frank P. Presta

(57) ABSTRACT

To provide a front-end panel which is low-cost and looks attractive when incorporating a reinforcement, a front-end panel includes a first holding member provided along the reinforcement so as to hold one edge of the reinforcement, a second holding member provided along the reinforcement so as to hold the other edge of the reinforcement, and connecting bands for connecting the first holding member with the second holding member.

7 Claims, 10 Drawing Sheets

FRONT-END PANEL

FIELD OF THE INVENTION

The present invention relates to a front-end panel for vehicles, and particularly to a front-end panel for vehicles, which holds a plurality of components and constitutes a front part of a vehicle body.

BACKGROUND OF THE INVENTION

There have been various conventional attempts for a technique to improve the rigidity of a front-end portion of a vehicle. One example of such attempts is Japanese Laid-Open Patent Application Tokukaihei 10-264855/1998 (published on Oct. 6, 1998) which discloses a front-end module structure.

According to the technique disclosed in this publication, a front-end panel is formed through injection-molding using a metal mold. The metal mold is provided with a metal reinforcement inserted therein, which has a plurality of through holes. As shown in FIG. 10, the metal reinforcement 100 and a front-end panel 200 are joined together in order to ensure superior rigidity of the front-end portion.

However, this technique according to the foregoing publication is disadvantageous in the following points.

Specifically, to join the front-end portion 200 and the metal reinforcement 100 together, the foregoing technique requires the front-end panel 200 to be provided with projection portions 300 which are to be engaged with the holes of the metal reinforcement 100. Accordingly, the foregoing technique is more costly in manufacturing, since it is required not only to form a plurality of holes on the metal reinforcement 100, but also to form a plurality of projection portions 300 on the front-end panel 200.

Further, generally, the metal mold is removed from the front-panel 200 by sliding itself with respect to the front-end panel 200; however, in the foregoing technique, the projection portions 300 jut out from the metal reinforcement 100, and therefore the metal mold has to be removed with a particular care in order to avoid the projection portions 300.

In view of this problem, FIG. 11 shows a mechanism in which slide pins 400a and 400b, which are separate bodies from a movable metal mold 500, are formed to environ the projection portions 300. The foregoing technique requires this mechanism to allow the movable metal mold 500 to be removed from the fixed metal mold 600 without being caught by the projection portions 300.

In this manner, the foregoing technique requires a complex mechanism for removing a metal mold, thus increasing manufacturing cost. Further, providing the projection sections 300 makes the appearance of the front-end panel 200 unattractive. Furthermore, since the metal reinforcement 100 cannot be adhered to a resin, the metal reinforcement 100 may be peeled off from its peripheral parts (denoted by F in FIG. 10), when heavily under load.

SUMMARY OF THE INVENTION

The present invention which has been done to solve the foregoing problems has an objective to provide a front-end panel which is low-cost and looks attractive when incorporating a reinforcement.

To achieve this objective, the front-end panel of the present invention is characterized by comprising: a first holding member which holds an edge of the reinforcement, the edge being in a lengthwise direction of the reinforcement; a second holding member which holds an opposing edge of the reinforcement, the opposing edge being in the lengthwise direction of the reinforcement; and a first connecting member which connects the first holding member with the second holding member.

According to this arrangement, the edges of the reinforcement are held by the first holding member and the second holding member so as to be fixed. Thus, the reinforcement can be fixed to the main body of the front-end panel without perforating the reinforcement.

The first holding member and the second holding member can be molded simultaneously with the molding of the front-end panel. While a metal reinforcement of a conventional front-end panel has to be perforated on the occasion of press molding of the reinforcement, the above-described arrangement makes it possible to do away with the perforating process, and hence the manufacturing costs of the reinforcement can be lowered. That is to say, in terms of the manufacturing costs of a front-end panel incorporating a reinforcement, forming a first holding member and a second holding member is better than perforating the reinforcement.

Further, according to the foregoing arrangement, the first holding member and the second holding member are both provided along the reinforcement so as to hold the respective edges of the reinforcement. Thus, since it is possible to design the first holding member and the second holding member in accordance with the shape of the reinforcement, the incorporation of the reinforcement into the front-panel does not make the appearance unattractive.

Further, since the first holding member is connected to the second holding member via the first connecting member, the stress exerted from the reinforcement to the first holding member and the second holding member is scattered to the first holding member, the second holding member, and the first connecting member. On this account, the reinforcement can be firmly fixed to the main body without causing the reinforcement to be peeled off from its peripheral parts.

For a fuller understanding of the nature and advantages of the invention, reference should be made to the ensuing detailed description taken in conjunction with the accompanying drawings.

DESCRIPTION OF THE EMBODIMENTS

The following will describe an embodiment of a front-end panel of the present invention with reference to FIGS. 1–9.

Figure 1:
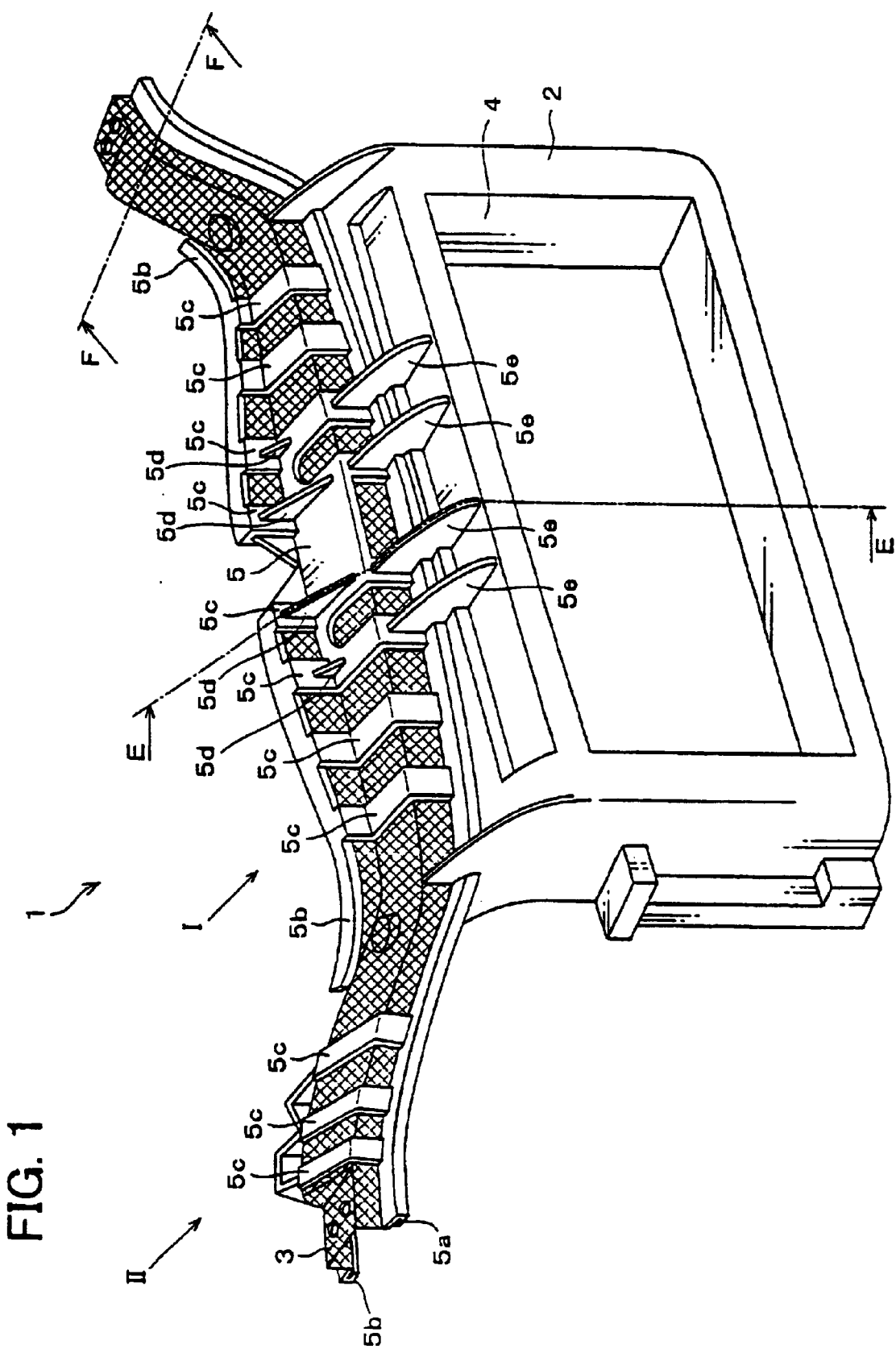
FIG. 1 is a perspective view showing a front-end panel according to one embodiment of the present invention.

As FIG. 1 illustrates, a front-end panel 1 of the present embodiment includes a main body 2 of the front-end panel and a reinforcement 3.

The main body 2 is, for instance, provided on the foreface of an engine room of a car, and includes a radiator mounting member 4 which is a rectangular frame and a reinforcement mounting member 5 attached above the radiator mounting member 4.

The reinforcement 3 is a beam-shaped member provided above the radiator mounting member 4. The reinforcement 3 is connected to the reinforcement mounting member 5 so as to suspend the radiator mounting member 4.

More specifically, the reinforcement mounting member 5 includes: a first holding member 5a which is provided along one edge of the reinforcement 3 in the longitudinal direction, in order to hold said one edge; a second holding member 5b which is provided along the other edge of the reinforcement 3 in the longitudinal direction, in order to hold said the other edge; and a plurality of connecting bands 5c (first connecting member) which are provided along the top surface of the reinforcement 3 and connect the first holding member 5a with the second holding member 5b. The connecting band 5c can be seen as a band-shaped section. Each of the connecting bands 5c is a flat plate which is 1 to 3 mm thick and 5 to 40 mm wide, more preferably 1.5 to 2.5 mm thick and 10 to 25 mm wide. The respective edges of the reinforcement 3 are held by the first holding member 5a and the second holding member 5b so that the reinforcement 3 is fixed to the reinforcement mounting member 5.

The reinforcement 3 has a hat-shaped lateral cross section at longitudinally opposing ends, while the central part of the reinforcement 3 has a step-like lateral cross section in the width direction. Thus, each of the connecting bands 5c provided at the respective ends of the reinforcement 3 has a hat-shaped cross section, while each of the connecting bands 5c provided around the central part of the reinforcement 3 has a step-like cross section.

The connecting bands 5c each having the step-like cross section are particularly provided with respective reinforcement ribs 5d each being in touch with both two orthogonal sides of the connecting band 5c. In other words, it is possible to see the rib 5d as a part of the connecting band 5c. In a part of the connecting band 5c where the reinforcement rib 5d is provided, the connecting band 5c and rib 5d form a T-shaped cross section in the direction orthogonal to the direction of connecting the first holding member 5a with the second holding member 5b.

Further, the connecting band 5c provided with the reinforcement rib 5d is further provided with a reinforcement rib 5e which connects the connecting band 5c with the radiator mounting member 4. With this arrangement, the strength of the reinforcement 3 is enhanced in the central part thereof, where loads are particularly imposed.

To build the above-mentioned front-end panel 1 into a car, a radiator is mounted in the radiator mounting member 4 and then mounting members at the respective ends of the reinforcement 3 which has been integrated with the reinforcement mounting member 3 are attached to an engine room.

Figure 2:
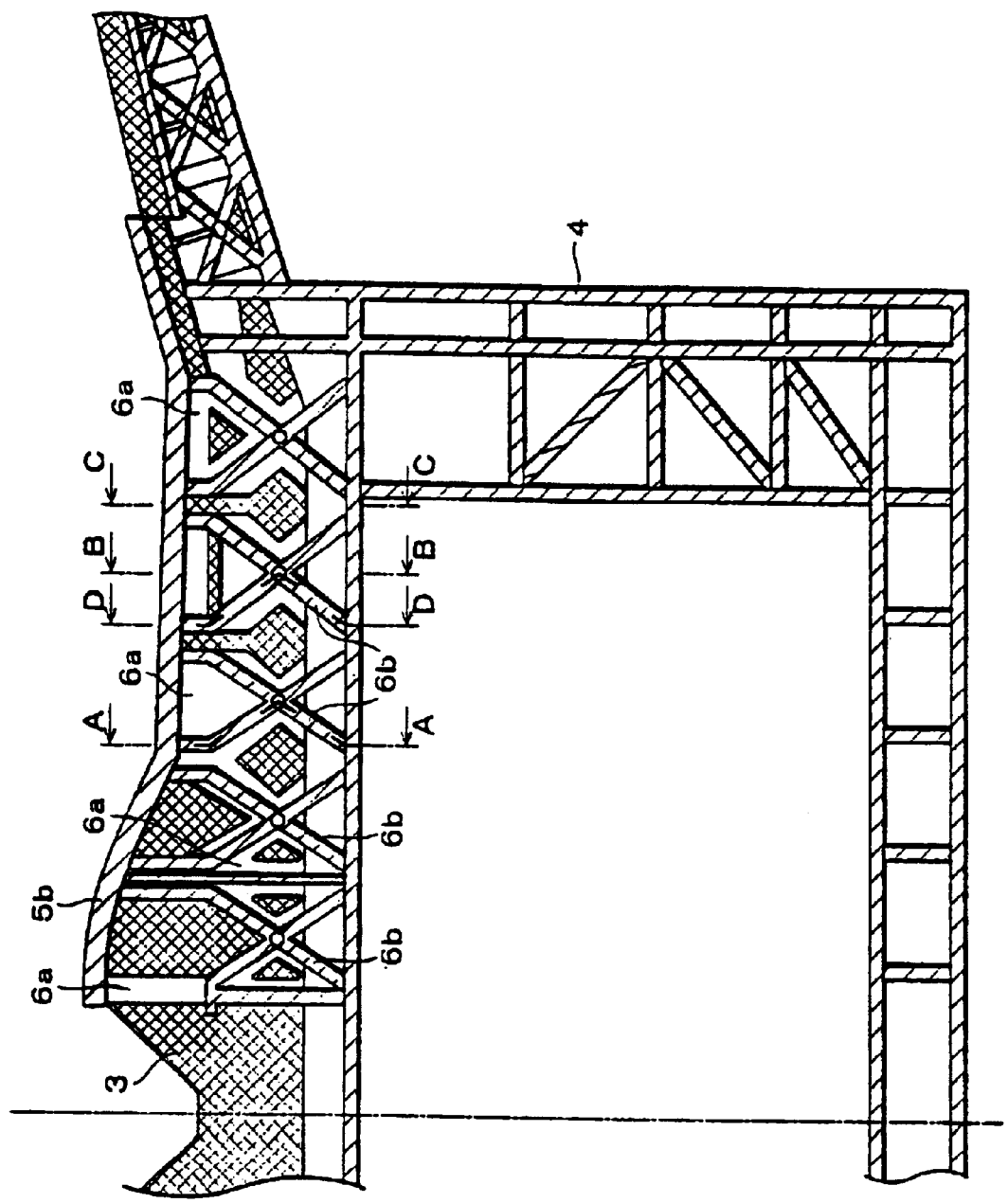
FIG. 2 is a rear view of the front-end panel of FIG. 1, viewed from the direction denoted by an allow I of FIG. 1.

FIG. 2 illustrates the front-end panel 1 viewed from the direction indicated by an arrow I, i.e. viewed from the engine room. By the way, hereinafter, the side of a member facing the engine room is termed "back side", while the side of the member facing the outside of a vehicle is termed "front side".

As FIG. 2 indicates, the reinforcement mounting member 5 is constituted by a plurality of connecting bands (second connecting member) 6a covering the back side of the reinforcement 3. On the back side of the reinforcement 3, these connecting bands 6a connect the first holding member 5a (cf. FIG. 1) with the second holding member 5b. The connecting band 6a can be seen as a band-shaped section.

Further, from the connecting bands 6a, a plurality of X-shaped ribs 6b extend towards the engine room (i.e. in the direction to the bottom of the FIG. 2). The rib 6b can be seen as a part of the connecting band 6a. In a part of the connecting band 6a where the rib 6b is provided, the connecting band 6a and the rib 6b form a T-shaped cross section in the direction orthogonal to the direction of connecting the first holding member 5a with the second holding member 5b. Also, on the back side of the radiator mounting member 4, a plurality of ribs are provided so as to form Z-shapes or matrices.

Figure 3:
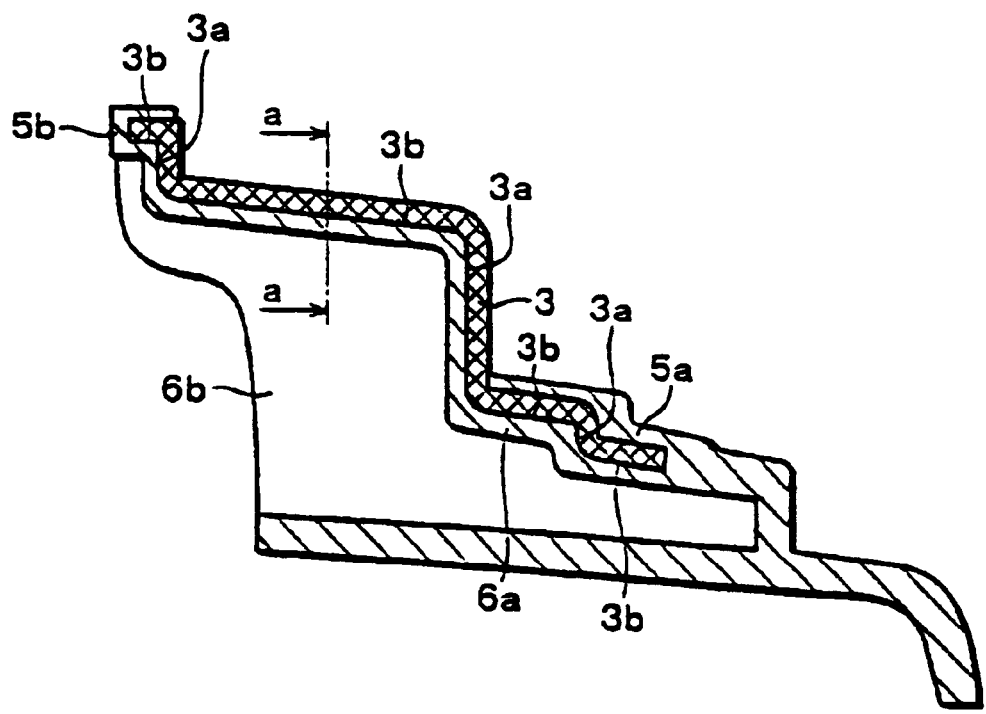
FIG. 3 is a vertical cross-sectional view of the reinforcement and the reinforcement mounting member, taken along the line A—A of FIG. 2.

FIG. 3 is a vertical cross-sectional view of the reinforcement 3 and the reinforcement mounting member 5, taken along the line A—A of FIG. 2. As in FIG. 3, the reinforcement 3 is shaped in a step-like manner. The connecting bands 6a are provided along the back side of the reinforcement 3.

Further, the reinforcement mounting member 5 is provided with the first holding member 5a and the second holding member 5b which wrap the respective edges of the reinforcement 3 from the back side to the front side. That is to say, the edges of the reinforcement 3 are fixed by the first holding member 5a and the second holding member 5b, so that the back side of the reinforcement 3 is supported by the connecting band 6a.

The back sides of the respective connecting bands 6a are reinforced by the ribs 6b (cf. FIG. 2). With this arrangement, the reinforcement 3 is firmly attached to the reinforcement mounting member 5.

As illustrated in FIG. 3, the reinforcement 3 has a vertical surface 3a and a horizontal surface 3b, and the connecting band 6a is provided along both the vertical surface 3a and the horizontal surface 3b. The rib 6b is formed so as to be in touch with both a part of the connecting band 6a along the vertical surface 3a and a part of the connecting band 6a along the horizontal surface 3b.

Figure 12:
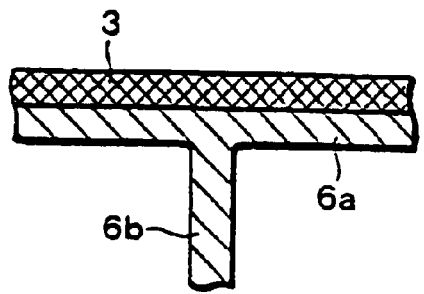
FIG. 12 is a vertical cross-sectional view of the reinforcement and the reinforcement mounting member, taken along the line a—a of FIG. 3.

FIG. 12 is a cross-sectional view of the reinforcement 3, the connecting band 6a, and the rib 6b, taken along the line a—a of FIG. 3. As the figure shows, in a part of the connecting band 6a where the rib 6b is provided, the connecting band 6a and the rib 6b form a T-shaped cross section in the direction orthogonal to the direction of connecting the first holding member 5a with the second holding member 5b.

Figure 4:
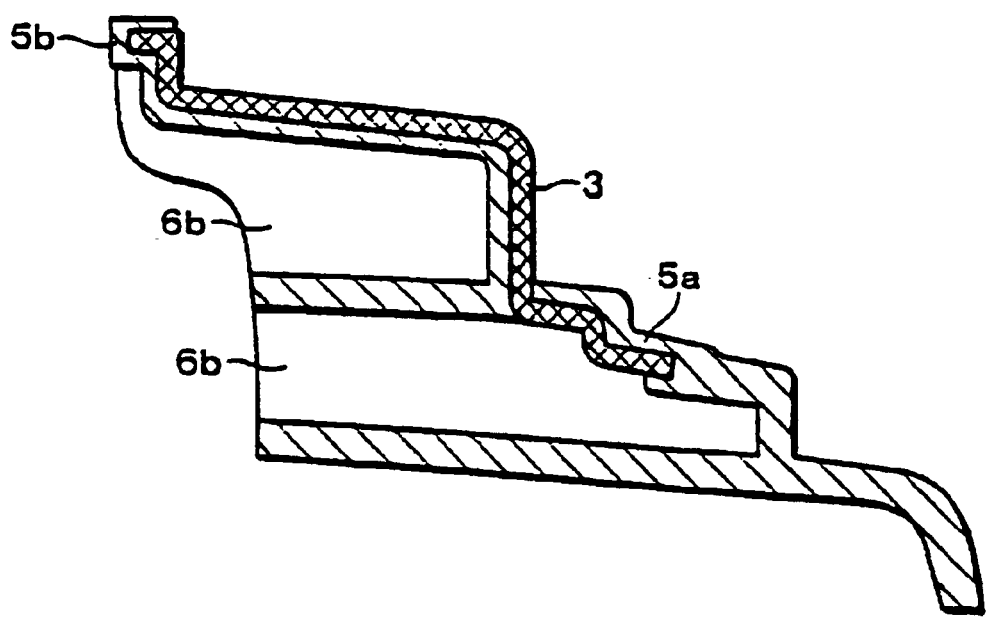
FIG. 4 is a vertical cross-sectional view of the reinforcement and the reinforcement mounting member, taken along the line B—B of FIG. 2.

FIG. 4 is a vertical cross-sectional view of the reinforcement 3 and the reinforcement mounting member 5, taken along the line B—B of FIG. 2. As in FIG. 4, the reinforcement 3 is shaped like a step and the respective edges thereof are fixed by the first holding member 5a and the second holding member 5b. The first holding member 5a is connected to the second holding member 5b via the rib 6b. This proves that, also in the portion of the reinforcement 3 along the B—B line (in FIG. 2), the reinforcement 3 is firmly fixed to the reinforcement mounting member 5.

Figure 5:
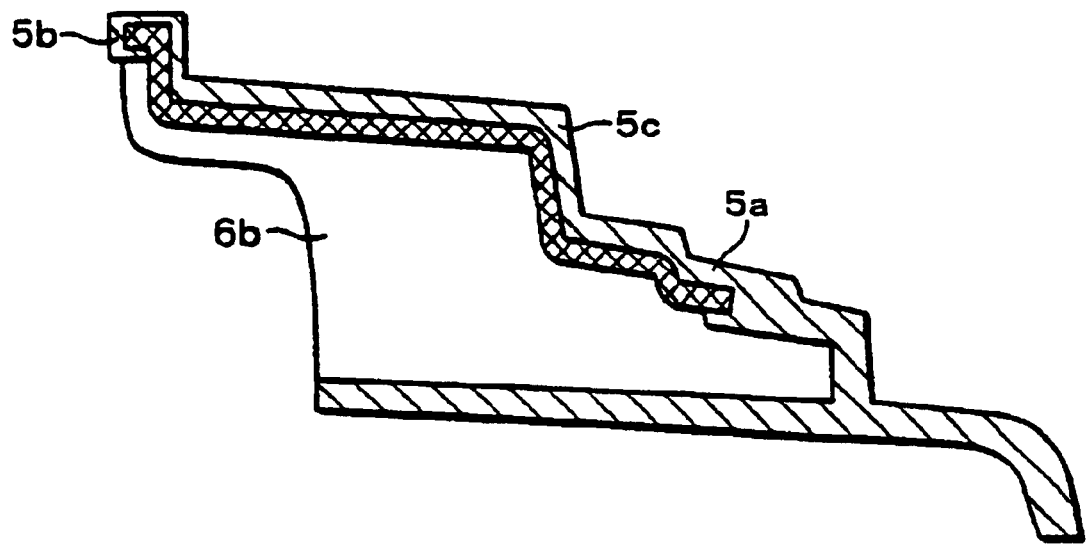
FIG. 5 is a vertical cross-sectional view of the reinforcement and the reinforcement mounting member, taken along the line C—C of FIG. 2.

FIG. 5 is a vertical cross-sectional view of the reinforcement 3 and the reinforcement mounting member 5, taken along the line C—C of FIG. 2. As FIG. 5 illustrates, the edges of the reinforcement 3 are fixed by the first holding member 5a and the second holding member 5b, respectively. Further, on the front side of the reinforcement 3, the first holding member 5a is connected with the second holding member 5b via the connecting band 5c.

Also on the back side of the reinforcement 3, the first holding member 5a is connected with the second holding member 5b via the rib 6b. This proves that the reinforcement 3 is firmly attached to the reinforcement mounting member 5 also in the section of the reinforcement 3 along the line C—C.

Figure 6:
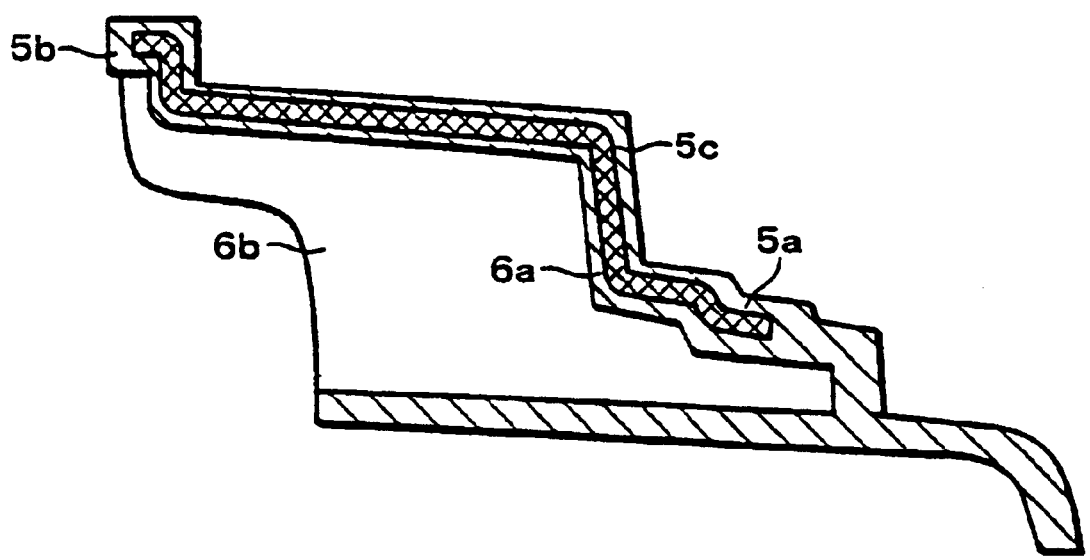
FIG. 6 is a vertical cross-sectional view of the reinforcement and the reinforcement mounting member, taken along the line D—D of FIG. 2.

FIG. 6 is a vertical cross-sectional view of the reinforcement 3 and the reinforcement mounting member 5, taken along the line D—D of FIG. 2. As in FIG. 6, the edges of the reinforcement 3 is fixed by the first holding member 5a and the second holding member 5b, respectively.

Further, the first holding member 5a is connected to the second holding member 5b via the connecting band 5c on the front side of the reinforcement 3, and also on the back side of the reinforcement 3, the first holding member 5a is connected to the second holding member 5b via the connecting band 6a.

Also on the back side of the connecting band 6a, the first holding member 5a is connected to the second holding member 5b via the rib 6b. With this arrangement, the reinforcement 3 is firmly attached to the reinforcement mounting member 5 in the section of the reinforcement 3 along the D—D line.

Figure 7:
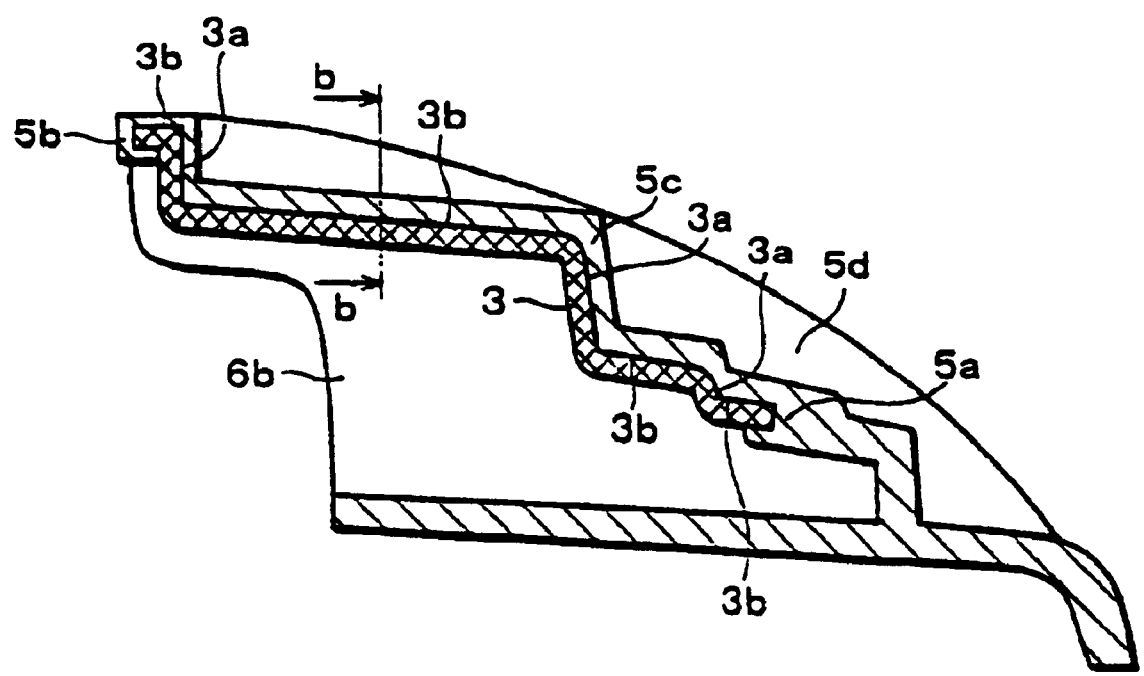
FIG. 7 is a vertical cross-sectional view of the reinforcement and the reinforcement mounting member, taken along the line E—E of FIG. 2.

FIG. 7 is a vertical cross-sectional view of the reinforcement 3 and the reinforcement mounting member 5, taken along the line E—E of FIG. 2. As in FIG. 7, the edges of the reinforcement 3 are fixed by the first holding member 5a and the second holding member 5b, respectively.

Further, on the front side of the reinforcement 3, the first holding member 5a is connected to the second holding member 5b via the connecting band 5c, and the front side of the connecting band 5c is reinforced by the reinforcement rib 5d (cf. FIG. 1). Also on the back side of the reinforcement 3, the first holding member 5a is connected to the second holding member 5b via the rib 6b.

In this manner, the reinforcement 3 is reinforced by the reinforcement rib 5d and the rib 6b from the front and back sides, respectively, so that the reinforcement 3 is firmly attached to the reinforcement mounting member 5.

As illustrated in FIG. 7, the reinforcement 3 has a vertical surface 3a and a horizontal surface 3b, and the connecting band 5c is provided along both the vertical surface 3a and the horizontal surface 3b. The rib 5d is formed so as to be in touch with both a part of the connecting band 5c along the vertical surface 3a and a part of the connecting band 5c along the horizontal surface 3b.

Figure 13:
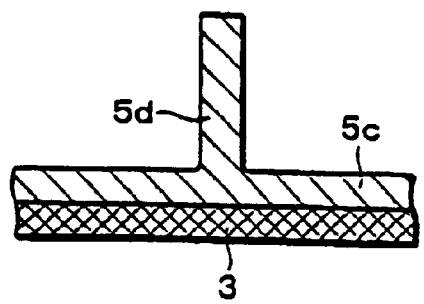
FIG. 13 is a vertical cross-sectional view of the reinforcement and the reinforcement mounting member, taken along the line b—b of FIG. 7.

FIG. 13 is a cross-sectional view of the reinforcement 3, the connecting band 5c, and the rib 5d, taken along the line b—b of FIG. 7. As the figure shows, in a part of the connecting band 5c where the rib 5d is provided, the connecting band 5c and the rib 5d form a T-shaped cross section in the direction orthogonal to the direction of connecting the first holding member 5a with the second holding member 5b.

Figure 8:
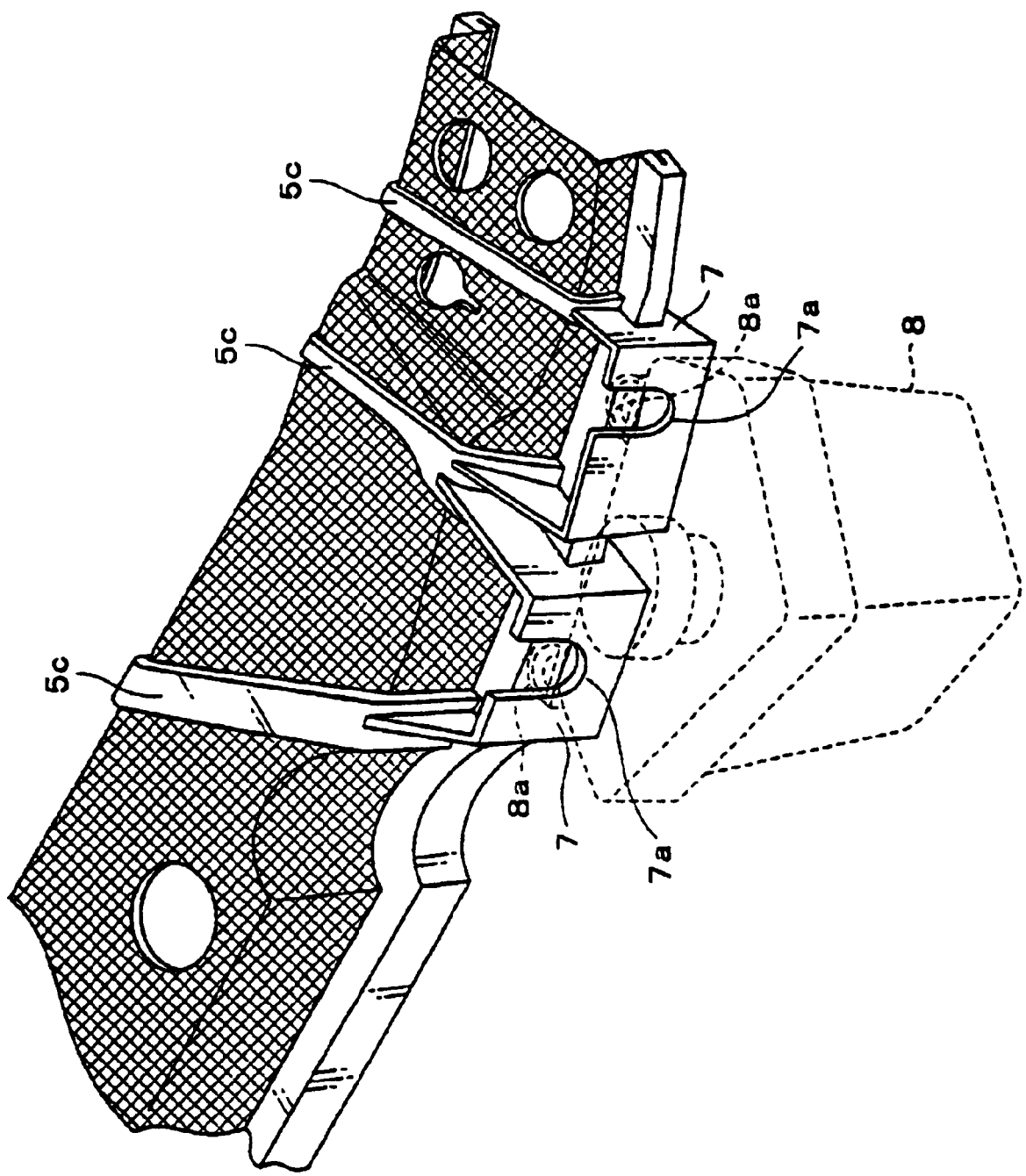
FIG. 8 is a rear view of the front-end panel of FIG. 1, viewed from the direction denoted by an allow II of FIG. 1.

FIG. 8 is a rear view of the front-end panel of FIG. 1, viewed from the direction denoted by an allow II of FIG. 1. As in FIG. 8, the connecting bands 5c may be connected to tank mounting members 7 each having a staple-shaped horizontal cross section. Since each of the tank mounting member 7 has a U-shaped notch 7a, it is possible to attach a tank 8 to the tank mounting members 7 by causing the notches 7a to engage with respective projection sections 8a of the tank 8.

Figure 14:
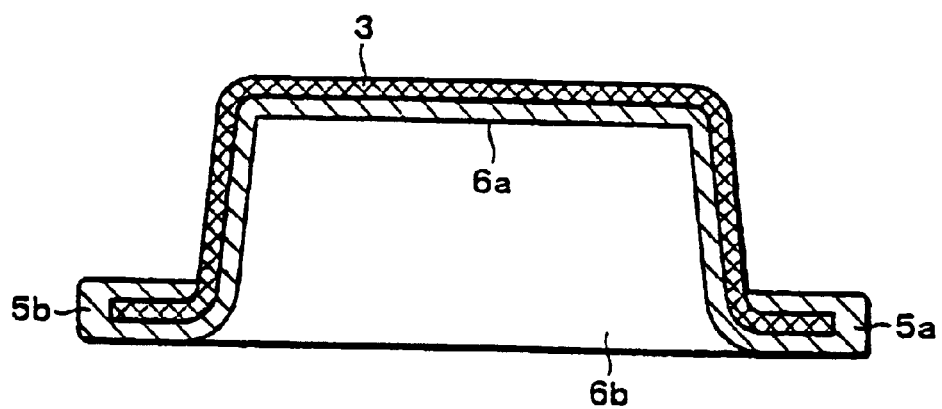
FIG. 14 is a vertical cross-sectional view of the reinforcement and the reinforcement mounting member, taken along the line F—F of FIG. 1.

FIG. 14 is a cross-sectional view of the reinforcement 3 and the reinforcement mounting member 5, taken along the line F—F of FIG. 1. As the figure shows, at each of the longitudinally opposing ends having hat-shaped lateral cross sections, the rib 6b is formed so as to be in touch with three sides of the connecting band 6a. With this arrangement, it is possible to firmly attach the reinforcement 3 to the reinforcement mounting member 5.

In this manner, the front-end panel 1 of the present embodiment includes: the first holding member 5a provided for holding one edge of the reinforcement 3, the edge being in the lengthwise direction of the reinforcement 3; the second holding member 5b provided for holding the other edge of the reinforcement 3, the other edge being in the lengthwise direction of the reinforcement 3; and the connecting bands 5c for connecting the first holding member 5a with the second holding member 5b.

According to this arrangement, the edges of the reinforcement 3 are held by the first holding member 5a and the second holding member 5b so as to be fixed. For this reason, it is possible to fix the reinforcement 3 to the main body 2 without perforating the reinforcement 3.

The first holding member 5a and the second holding member 5b are molded simultaneously with the molding of the front-end panel. While a metal reinforcement of a conventional front-end panel has to be perforated on the occasion of press molding of the reinforcement, the present embodiment makes it possible to do away with the perforating process, and hence the manufacturing costs of the main body 2 can be lowered. That is to say, in terms of the manufacturing costs of the front-end panel 1 incorporating the reinforcement 3, forming the first holding member 5a and the second holding member 5b is better than perforating the reinforcement 3.

Figure 9:
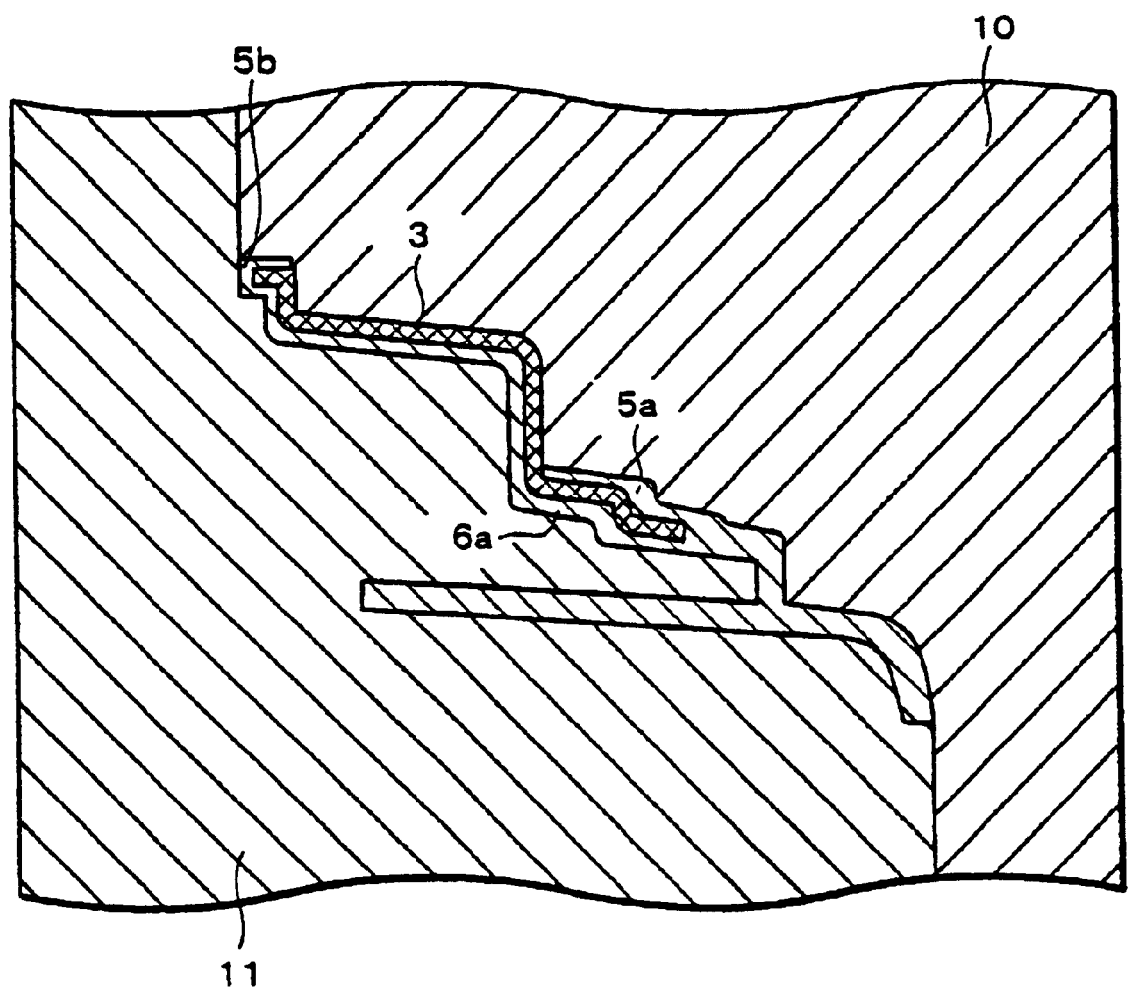
FIG. 9 is a cross-sectional view showing the reinforcement and the reinforcement mounting member of FIG. 2, in conjunction with a metal mold thereof.
Figure 10:
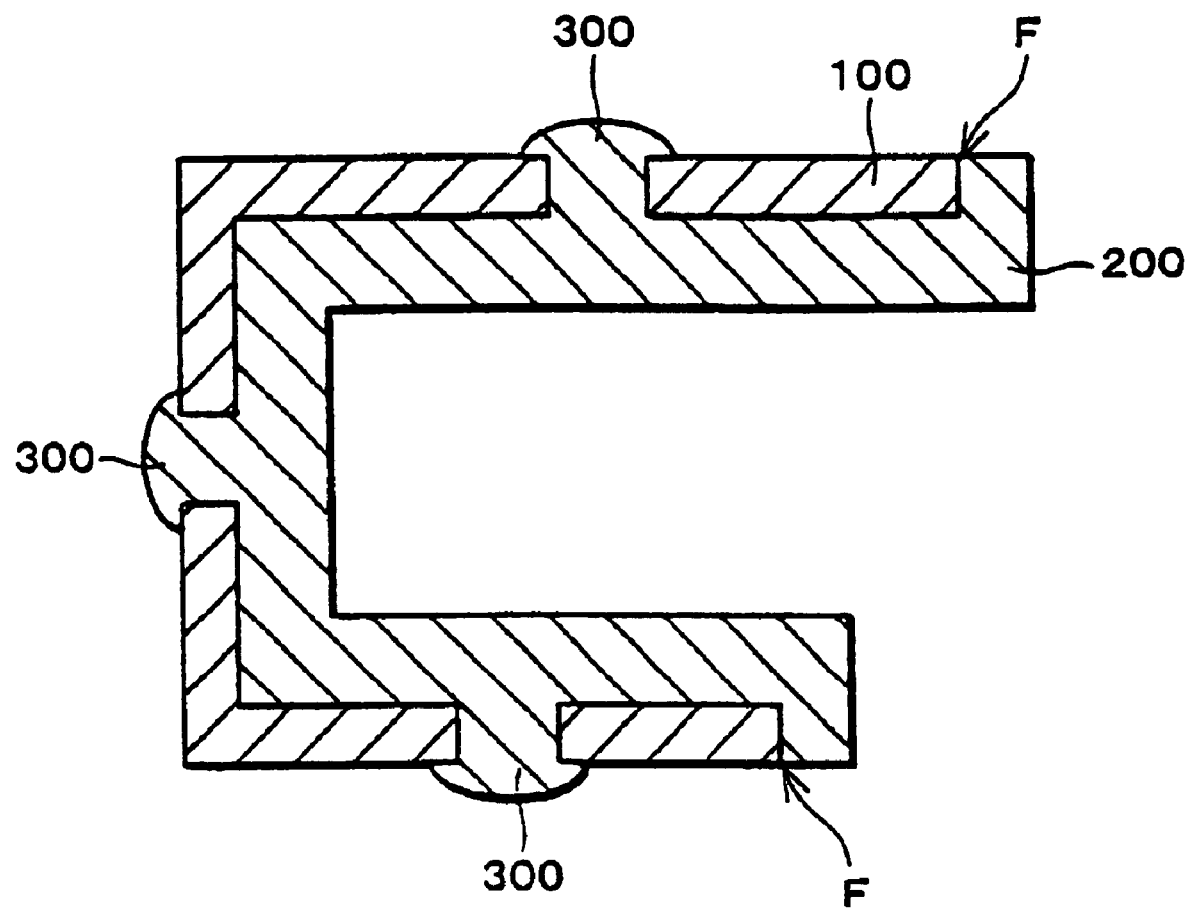
FIG. 10 is a cross-sectional view showing a conventional front-end panel.
Figure 11:
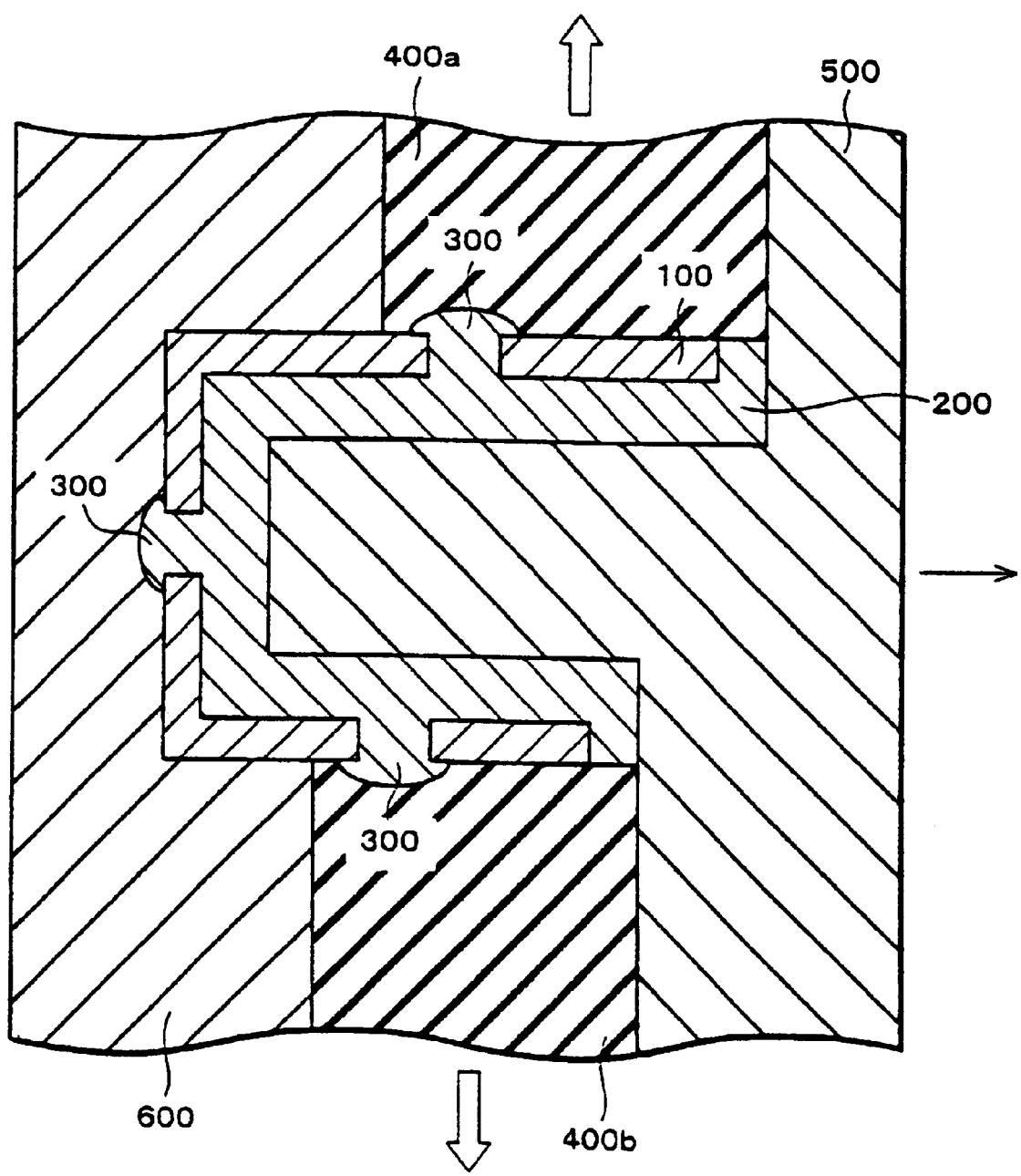
FIG. 11 is a cross-sectional view of the front-end panel of FIG. 10, in conjunction with a metal mold thereof.

Since the reinforcement 3 of the present embodiment is fixed to the main body 2 without perforating, it is unnecessary to provide slide pins 400a and 400b in a metal mold of the front-end panel as in the conventional art. That is to say, as illustrated in FIG. 9, it is possible to mold the front-end panel only by a fixed metal mold 10 and a movable metal mold 11, and hence the reduction of the manufacturing costs can be realized.

Further, according to the foregoing arrangement, the first holding member 5a and the second holding member 5b are both provided along the reinforcement 3 so as to hold the respective edges of the reinforcement 3. Thus, since it is possible to design the first holding member 5a and the second holding member 5b in accordance with the shape of the reinforcement 3, the incorporation of the reinforcement 3 into the front-panel 1 does not make the appearance unattractive.

Moreover, since the first holding member 5a is connected to the second holding member 5b via the connecting bands 5c, the stress exerted from the reinforcement 3 to the first holding member 5a and the second holding member 5b is scattered to the first holding member 5a, the second holding member 5b, and the connecting bands 5c. On this account, it is possible to firmly fix the reinforcement 3 to the main body 2.

Further, in the front-end panel 1 of the present embedment, the connecting bands 5c are provided along the surface of the reinforcement 3.

According to this arrangement, since the connecting bands 5c are provided along the surface of the reinforcement 3, no gaps are formed between the connecting bands 5c and the reinforcement 3.

Thus, since the stress exerted on the reinforcement 3 is efficiently scattered to the connecting bands 5c, it is possible to improve the overall strength of the front-end panel 1.

Further, in the front-end panel 1 of the present embodiment, the connecting band 5c has a band-shaped section from which the rib 5d juts out, and in a part of the connecting band 5c where the rib 5d is provided, the connecting band 5c and the rib 5d form a T-shaped cross section in the direction orthogonal to the direction of connecting the first holding member 5a with the second holding member 5b.

According to this arrangement, the cross sections of the connecting bands 5c and the reinforcement ribs 5d are T-shaped. With this arrangement, the cross-sectional second moment increases compared to the case that the first connecting member is constituted by connecting bands 5c each having a simple rectangular shape, so that the strength of the first connecting member can be improved.

Consequently, it is possible to improve the overall strength of the front-end panel 1.

Further, the front-end panel 1 of the present embodiment includes the connecting bands 6a for connecting the first holding member 5a with the second holding member 5b, the connecting bands 6a being provided along the surface, of the reinforcement 3, opposite to the surface on which the connecting bands 5c are provided.

According to this arrangement, on the both sides of the reinforcement 3, the first holding member 5a is connected to the second holding member 5b via the connecting bands 5c and the connecting bands 6a via the connecting bands 5c and the connecting bands 6a, respectively. Thus, the cross-sectional second moment of the front-panel 1 is increased thanks to the additional connection of the first holding member 5a with the second holding member 5b via the connection bands 6a, compared to the case that the holding members are connected to each other sorely via the connecting bands 5c. As a result, it is possible to further improve the strength of the front-end panel.

Further, in the front-end panel 1 of the present embodiment, the connecting bands 6a and the ribs 6b have T-shaped cross sections in the direction orthogonal to the direction of connecting the first holding member 5a with the second holding member 5b.

According to this arrangement, the cross sections of the connecting bands 6a and the ribs 6b are T-shaped. Thus, since the cross-sectional second moment is improved compared to the case that the connecting bands 6a have simple rectangular shapes, it is possible to improve the strength of the second connecting member.

Further, the front-end panel 1 of the present embodiment includes the vertical surface 3a and the horizontal surface 3b, and the rib 5d is formed so as to be in touch with both a part of the connecting band 5c along the vertical surface 3a and a part of the connecting band 5c along the horizontal surface 3b.

According to this arrangement, since the part of the connecting band 5c along the vertical surface 3a and the part of the connecting band 5c along the horizontal surface 3b are both in touch with the rib 5d, the strength of the first connecting section is increased.

Further, the front-end panel 1 of the present embodiment includes the vertical surface 3a and the horizontal surface 3b, and the rib 6b is formed so as to be in touch with both a part of the connecting band 6a along the vertical surface 3a and a part of the connecting band 6a along the horizontal surface 3b.

According to this arrangement, since the part of the connecting band 6a along the vertical surface 3a and the part of the connecting band 6a along the horizontal surface 3b are both in touch with the rib 6b, the strength of the first connecting section is increased.

Consequently, it is possible to improve the overall strength of the front-end pane.

As described above, the front-end panel of the present invention, which is reinforced by a reinforcement provided in a width direction of a vehicle, comprises: a first holding member which holds an edge of the reinforcement; a second holding member which holds an opposing edge of the reinforcement; and a first connecting member which connects the first holding member with the second holding member.

According to this arrangement, the edges of the reinforcement are held by the first holding member and the second holding member so as to be fixed. Thus, the reinforcement can be fixed to the main body of the front-end panel without perforating the reinforcement.

The first holding member and the second holding member are molded simultaneously with the molding of the front-end panel. While a metal reinforcement of a conventional front-end panel has to be perforated on the occasion of press molding of the reinforcement, the present embodiment makes it possible to do away with the perforating process, and hence the manufacturing costs of the main body can be lowered. That is to say, in terms of the manufacturing costs of a front-end panel incorporating a reinforcement, forming a first holding member and a second holding member is better than perforating the reinforcement.

Further, according to the foregoing arrangement, the first holding member and the second holding member are both provided along the reinforcement so as to hold the respective edges of the reinforcement. Thus, since it is possible to design the first holding member and the second holding member in accordance with the shape of the reinforcement, the incorporation of the reinforcement into the front-panel does not make the appearance unattractive.

Further, since the first holding member is connected to the second holding member via the first connecting member, the stress exerted from the reinforcement to the first holding member and the second holding member is scattered to the first holding member, the second holding member, and the first connecting member. On this account, the reinforcement can be firmly fixed to the main body without causing the reinforcement to be peeled off from its peripheral parts.

The foregoing front-end panel of the present invention is preferably arranged such that the first connecting member is provided along a surface of the reinforcement.

According to this arrangement, since the first connecting member is provided along the surface of the reinforcement, no gap is formed between the first connecting member and the reinforcement.

As a result, since the stress exerted on the reinforcement is efficiently scattered to the first connecting member, it is possible to improve the overall strength of the front-end panel.

The foregoing front-end panel of the present invention is preferably arranged such that, the first connecting member has a T-shaped cross section in a direction orthogonal to a direction of connecting the first holding member with the second holding member.

According to this arrangement, the cross section of the first connecting member is T-shaped. Thus, since the cross-sectional second moment is increased comparing to the case that the first connecting member has a simple rectangular shape, it is possible to improve the strength of the first connecting member.

As a result, it is possible to improve the overall strength of the front-end panel.

The foregoing front-end panel of the present invention is preferably arranged so as to further comprise a second connecting member which connects the first holding member with the second holding member and is provided along a surface of the reinforcement, the surface being opposite to the surface along which the first connecting member is provided.

According to this arrangement, on the both sides of the reinforcement, the first holding member is connected to the second holding member via the first connecting member and the second connecting member, respectively. Thus, compared to the case that the first holding member is connected to the second holding member sorely via the first connecting member, the cross-sectional second moment of the front-end panel is increased. Thus, it is possible to further improve the strength of the front-end panel.

The foregoing front-end panel of the present invention is preferably arranged such that, the second connecting member has a T-shaped cross section in a direction orthogonal to a direction of connecting the first holding member with the second holding member.

According to this arrangement, the cross section of the second connecting member is T-shaped. Thus, since the cross-sectional second moment is increased comparing to the case that the second connecting member has a simple rectangular shape, it is possible to improve the strength of the second connecting member.

As a result, it is possible to improve the overall strength of the front-end panel.

The foregoing front-end panel of the present invention is preferably arranged such that, the reinforcement has a vertical surface and a horizontal surface, and the rib is formed so as to be in touch with both a part of the band-shaped section along the vertical surface and a part of the band-shaped section along the horizontal surface.

According to this arrangement, since the part of the band-shaped section along the vertical surface and the part of the band-shaped section along the horizontal surface are both in touch with the rib, the strength of the first connecting member is increased.

The foregoing front-end panel of the present invention is preferably arranged such that, the reinforcement has a vertical surface and a horizontal surface, and the rib is formed so as to be in touch with both a part of the band-shaped section along the vertical surface and a part of the band-shaped section along the horizontal surface.

According to this arrangement, since the part of the band-shaped section along the vertical surface and the part of the band-shaped section along the horizontal surface are both in touch with the rib, the strength of the second connecting member is increased.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A front-end panel reinforced by a reinforcement provided in a width direction of a vehicle, comprising:
    a first holding member which holds an edge of the reinforcement, the edge being in a lengthwise direction of the reinforcement;
    a second holding member which holds an opposing edge of the reinforcement, the opposing edge being in the lengthwise direction of the reinforcement; and
    a first connecting member which connects the first holding member with the second holding member.

2. The front-end panel as defined in claim 1, wherein, the first connecting member is provided along a surface of the reinforcement.

3. The front-end panel as defined in claim 2, wherein, the first connecting member has a band-shaped section from which a rib juts out, and in a part of the first connecting member where the rib is provided, the first connecting member has a T-shaped cross section in a direction orthogonal to a direction of connecting the first holding member with the second holding member.

4. The front-end panel as defined in claim 2, further comprising a second connecting member which connects the first holding member with the second holding member and is provided along a surface of the reinforcement, the surface being opposite to the surface along which the first connecting member is provided.

5. The front-end panel as defined in claim 4, wherein, the second connecting member has a band-shaped section from which a rib juts out, and in a part of the second connecting member where the rib is provided, the second connecting member has a T-shaped cross section in a direction orthogonal to a direction of connecting the first holding member with the second holding member.

6. The front-end panel as defined in claim 3, wherein, the reinforcement has a vertical surface and a horizontal surface, and the rib is formed so as to be in touch with both a part of the band-shaped section along the vertical surface and a part of the band-shaped section along the horizontal surface.

7. The front-end panel as defined in claim 5, wherein, the reinforcement has a vertical surface and a horizontal surface, and the rib is formed so as to be in touch with both a part of the band-shaped section along the vertical surface and a part of the band-shaped section along the horizontal surface.

* * * * *